(12) United States Patent
Kobayashi

(10) Patent No.: US 7,334,239 B2
(45) Date of Patent: Feb. 19, 2008

(54) OPTICAL DISC APPARATUS

(75) Inventor: Tomohiro Kobayashi, Daito (JP)

(73) Assignee: Funai Electric Co., Ltd., Daito-shi (JP)

( * ) Notice: Subject to any disclaimer, the term of this patent is extended or adjusted under 35 U.S.C. 154(b) by 377 days.

(21) Appl. No.: 11/083,958

(22) Filed: Mar. 21, 2005

(65) Prior Publication Data

US 2005/0210481 A1    Sep. 22, 2005

(30) Foreign Application Priority Data

Mar. 19, 2004    (JP) .............................. 2004-080435

(51) Int. Cl.
*G11B 17/04*    (2006.01)
(52) U.S. Cl. .................... 720/602; 720/611; 720/605
(58) Field of Classification Search ................ 720/601, 720/602, 604, 605, 611
See application file for complete search history.

(56) References Cited

U.S. PATENT DOCUMENTS

| 5,123,005 | A | * | 6/1992 | Kurosu ..................... 720/602 |
| 5,864,529 | A | * | 1/1999 | Liao et al. ................. 720/604 |
| RE37,170 | E | * | 5/2001 | Kurosu ..................... 720/690 |
| 6,944,872 | B2 | * | 9/2005 | Moriyama et al. ........ 720/690 |
| 7,020,886 | B2 | * | 3/2006 | Kim et al. ................. 720/711 |
| 2003/0016595 | A1 | * | 1/2003 | Kim et al. ................. 369/30.93 |
| 2004/0143837 | A1 | * | 7/2004 | Kim ........................... 720/611 |

FOREIGN PATENT DOCUMENTS

| JP | 2-72457 | | 6/1990 |
| JP | 07-272373 | | 10/1995 |
| JP | 09282762 | A * | 10/1997 |
| JP | 10302361 | A * | 11/1998 |
| JP | 2002133747 | A * | 5/2002 |
| JP | 2002-334502 | | 11/2002 |
| JP | 3094496 | | 3/2003 |
| JP | 3096549 | | 7/2003 |
| KR | 2002091606 | A * | 12/2002 |

OTHER PUBLICATIONS

Japanese office action dated Aug. 21, 2007, with English translation.

* cited by examiner

*Primary Examiner*—William J. Klimowicz
(74) *Attorney, Agent, or Firm*—Crowell & Moring LLP

(57) ABSTRACT

In an optical disc apparatus, a harsh blow sound due to collision of first stoppers of a tray and third stoppers of a main chassis when the tray reaches to a terminal position of drawing thereof is reduced. When a second stopper of the tray contacts with the front end portion of a cam slider, the front end portion of the cam slider is elastically deformed so that moving speed of the tray is largely decelerated. Consequently, the blow sound due to contact of the first stoppers of the tray and the third stoppers of the main chassis is radically reduced.

12 Claims, 4 Drawing Sheets

OPTICAL DISC APPARATUS

BACKGROUND OF THE INVENTION

1. Field of the Invention

The present invention relates to an optical disc apparatus used for reading and writing data with respect to an optical disc such as a DVD (Digital Versatile Disc), and so on, and especially relates to an optical disc apparatus having drawer mechanism of a tray on which an optical disc is disposed.

2. Description of the Related Art

In a conventional optical disc apparatus, for example, shown in laid-open bulletin of unexamined Japanese Patent Application No. 2002-334502, stoppers are formed on both of a tray and a chassis of the optical disc apparatus so as to stop the tray at a terminal position of the drawing of the tray. However, in such an optical disc apparatus, the stopper formed on the tray contacts to the stopper formed on the chassis at the terminal position of the drawing of the tray, and a harsh blow sound occurs. For preventing the occurrence of the harsh blow sound, an inclined plane, which is to be contacted with the stopper of the chassis, is formed in the vicinity of the stopper of the tray, so as to apply a load to the tray just before the end of the motion for drawing the tray. Thus, the moving speed of the tray is rapidly decelerated, and the intensity of the blow sound can be reduced. However, there is fear a particle ingredient of the lubricant, which is applied to prevent abrasion such as the inclined plane, is scattered in the apparatus inside, and to give bad influence to movement of the apparatus, when the tray is moved frequently. In addition, retreat movement of the tray cannot be performed smoothly, when the fine particle lubricant comes off from contact portions of the tray and the chassis.

In another conventional optical disc apparatus, for example, shown in bulletin of Registered Japanese Utility Model No. 3094496, an elastically deformable portion of resin is formed on a tray so as to be deformed when it contacts on an inner face of a chassis of the apparatus. In addition, a laid-open bulletin of unexamined Japanese Utility Model Application No. 2-72457 shows a mechanism for moving a revolving table for revolving an optical disc up and down with driving force to draw a tray.

SUMMARY OF THE INVENTION

A purpose of the present invention is to provide an optical disc apparatus, in which a blow sound due to collision of the stoppers of the tray and the chassis at the terminal position of drawing of the tray can be reduced with using no fine particle lubricant.

An optical disc apparatus in accordance with an aspect of the present invention comprises: a main chassis; a tray, to which an optical disc is disposed, movably held on the main chassis and drawn from the main chassis in a predetermined direction; a driving mechanism provided on the main chassis for reciprocally moving the tray in the predetermined direction; and an elastically deformable member which contacts the tray just before a terminal position of drawing of the tray from the main chassis where the drawing motion of the tray is stopped in a manner so that moving speed of the tray is decelerated due to elastic deformation of the elastically deformable member.

By such a configuration, kinetic energy of the tray is consumed to elastically deform the elastically deformable member when the elastically deformable member contacts the tray just before the terminal position of drawing of the tray, so that moving speed of the tray is largely decelerated. When the tray reaches to the terminal position of drawing the tray, the moving speed of the tray has become very slow. Consequently, blow sound due to collision of the tray and the main chassis is radically reduced, so that a quiet optical disc apparatus can be provided.

When the elastically deformable member is made of a material superior to wear resistance and having a coefficient of elasticity smaller than that of a material of the tray, it is no need to spread a fine particle lubricant to contacting portions of the tray and the elastically deformable member. Consequently, there is no fear to give bad influence to movement of the optical disc apparatus due to scattering of the powder ingredient of the lubricant in the inside of the apparatus. Smoothness of the drawing motion of the tray can be maintained in long-term use.

DETAILED DESCRIPTION OF THE EMBODIMENT

Figure 1:
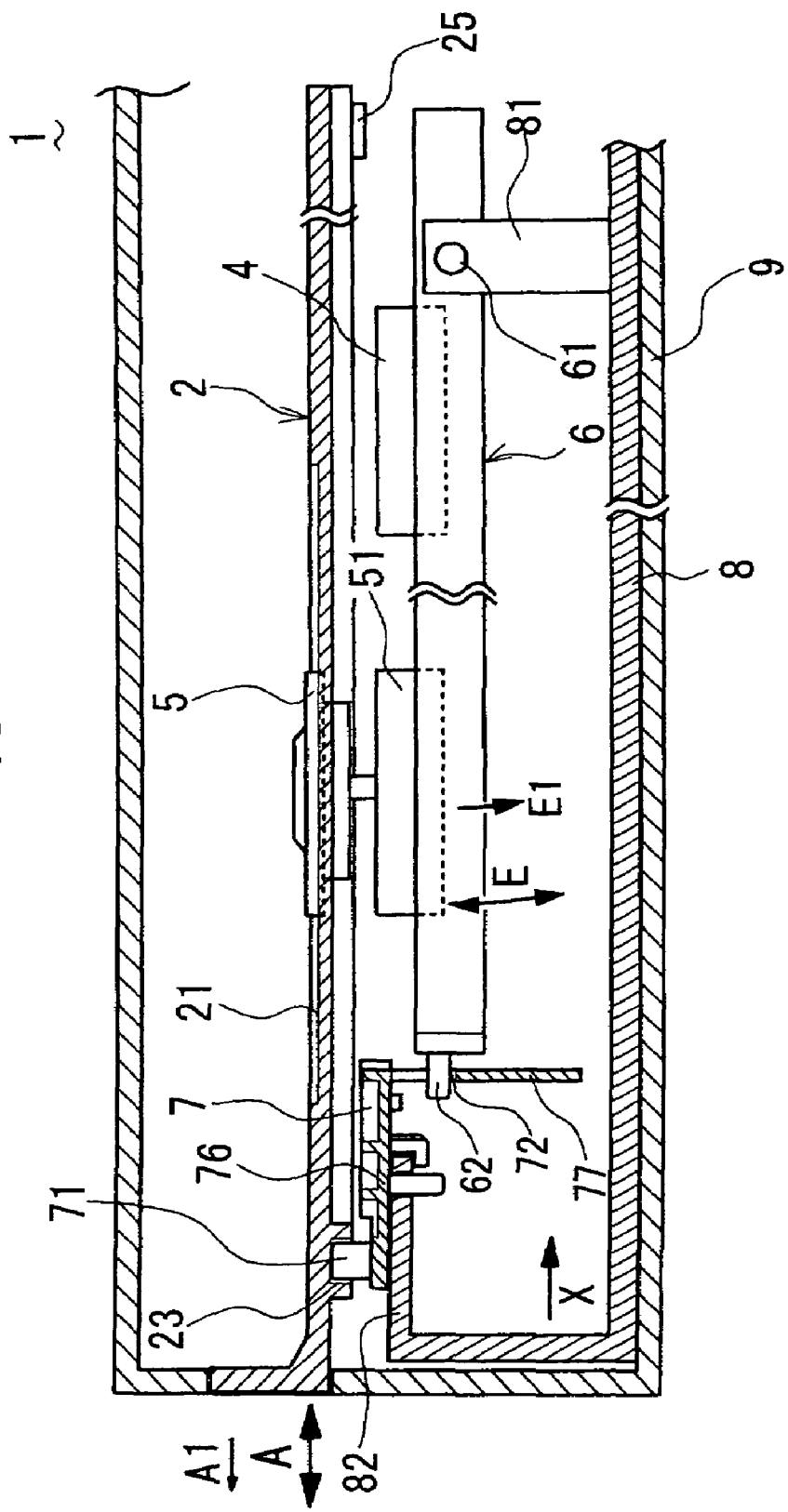
FIG. 1 is a cross sectional side view showing a constitution of an optical disc apparatus in accordance with an embodiment of the present invention.

An optical apparatus in accordance with an embodiment of the present invention is described with reference to figures. FIG. 1 shows a constitution of an optical disc apparatus in accordance with the embodiment.

The optical disc apparatus 1 comprises a tray 2 which is used for loading an optical disc into an inside of the apparatus, a drive gear 3 (see FIG. 2) for moving the tray 2, an optical pick-up 4 which is used for writing and reading data on and from the optical disc, a revolving table 5 for supporting and rotating the optical disc, a movable chassis 6 on which the optical pickup 4 and the revolving table 5 are mounted, a cam slider 7 for rotationally swinging the movable chassis 6 around a pivot 61, a main chassis 8 on which the movable chassis 6, the cam slider 7, and so on are mounted, and a cover 9 for covering the above-mentioned elements.

Figure 2:
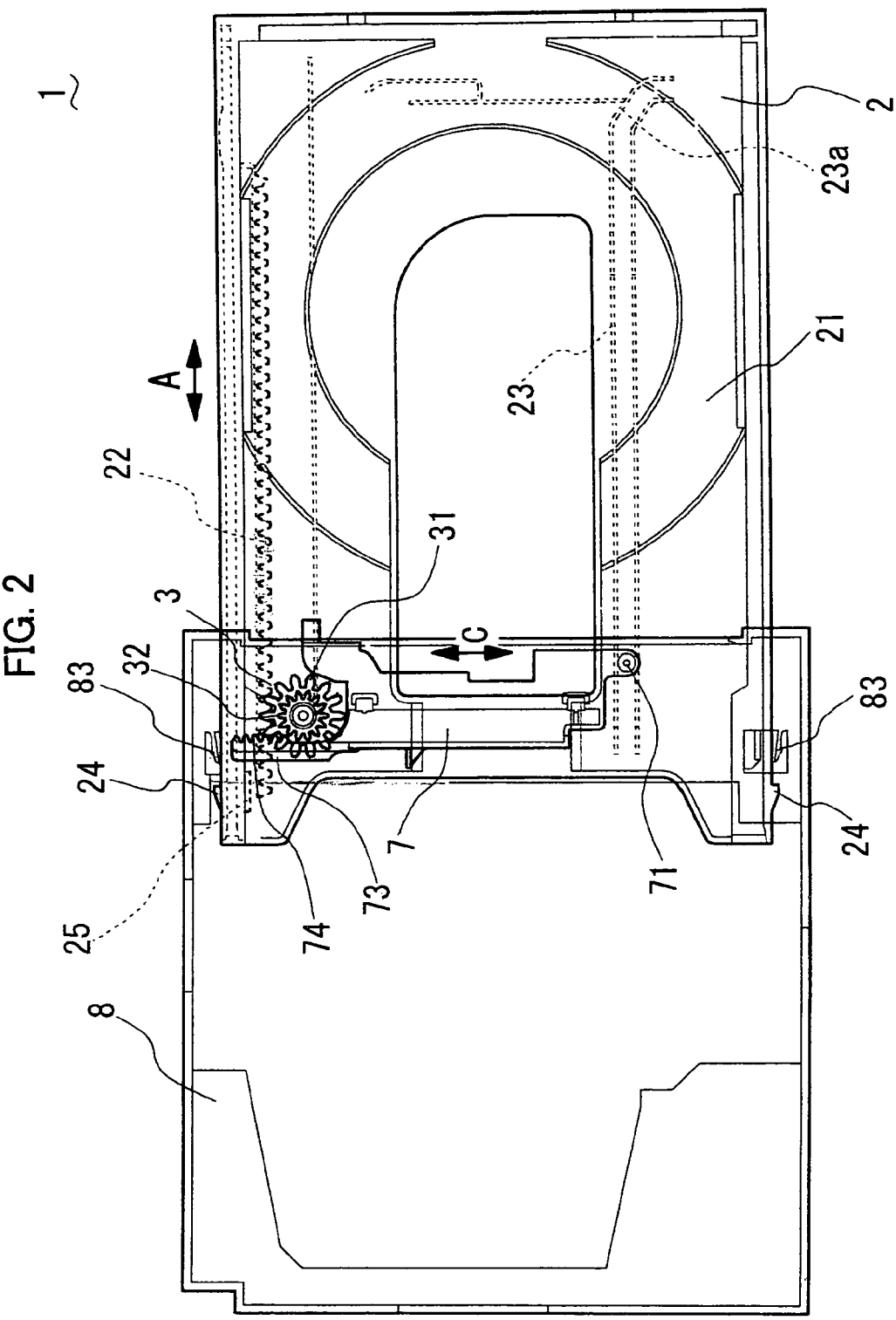
FIG. 2 is a plan view showing an essential part of the above-mentioned apparatus.
Figure 3:
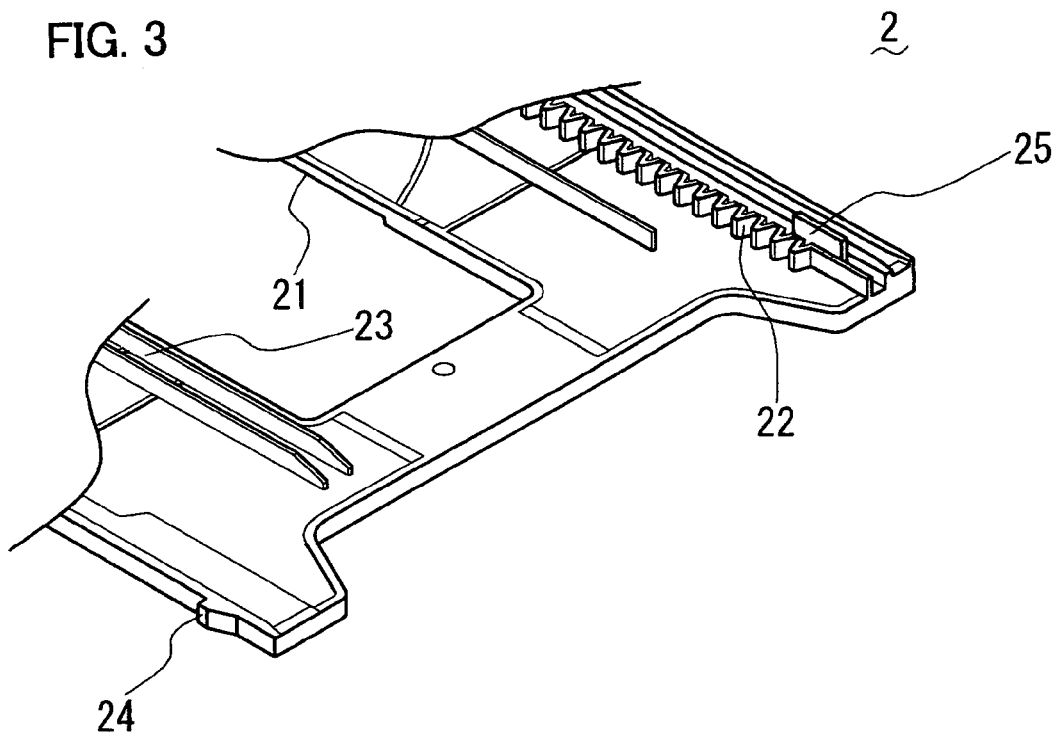
FIG. 3 is a perspective view showing a rear side shape of a tray of the above-mentioned apparatus.

FIG. 2 shows a visualized constitution of an essential part of the optical disc apparatus 1, and FIG. 3 shows a structure of the tray 2. The tray 2 has a concave portion 21 on which an optical disc is disposed, a first rack 22 which is engaged with a lower stage gear 31 of the drive gear 3, and a guide groove 23 which is engaged with a boss 71 of the cam slider and serves as a guide when the tray 2 is drawn. The concave portion 21 is formed on a front face of the tray 2, and the first rack 22 and the guide groove 23 are formed on a rear face of the tray 2. The tray 2 is reciprocally movable in a direction shown by arrow A by the drive gear 3 and the can slider 7

The tray 2 further has a pair of first stoppers 24 which contacts a pair of stoppers 83 formed for protruding on the main chassis 8 at a terminal position of motion of drawing of the tray 2 so as to stop the motion of the tray 2, and a second stopper 25 which contacts a front end portion 73 of the cam slider 7 at a position just before the terminal position of drawing of the tray 2. The first stoppers 24 are provided in both side faces of the tray 2 in the vicinity of the rear end thereof. The second stopper 25 is provided at a position on the rear face of the tray 2 where the second stopper 25 can be contacted with the front end portion 73 of the cam slider 7 when the tray 2 is positioned just before the terminal position of drawing thereof. In addition, the tray 2 and the main chassis 8 are molded of relatively hard synthetic resin such as polystyrene to secure necessary strength.

The drive gear 3 is a two stage gear having the lower stage gear 31 engaging with the rack 22 of the tray 2 and an upper stage gear 32 engaging with a rack 74 of the cam slider 7. The drive gear 3 is rotated for moving the tray 2 in the direction shown by arrow A and for moving the cam slider 7 in a direction shown by arrow C, when it receives a driving force transmitted through a plurality of gears (not shown) from a driving source such as a motor (not shown).

The optical pick-up 4 (see FIG. 1) is arranged to face a recording surface of an optical disc loaded on the revolving table 5. When data is written on the optical disc, the optical pickup 4 irradiates laser beam of higher power to the recording surface of the optical disc while the optical disc is revolved. Alternatively, when data is read out from the optical disc, the optical pickup 4 irradiates laser beam of lower power than that used for writing the data and receives reflection beam from the recording face of the optical disc.

The revolving table 5 is coupled with an output shaft of a spindle motor 51 so as to be rotated with holding the optical disc owing to a driving force of the spindle motor 51. The optical pickup 4 and the spindle motor 51 are put on the movable chassis 6.

The movable chassis 6 has the above-mentioned pivot 61 at an end where optical pick-up 4 is put on, and a boss 62 at the other end. The pivot 61 is rotatably borne on fulcrums 81 in a manner so that the movable chassis 6 can be turned in a direction shown by arrow E. The boss 62 is engaged with a cam groove 72 formed on the cam slider 7.

Figure 4:
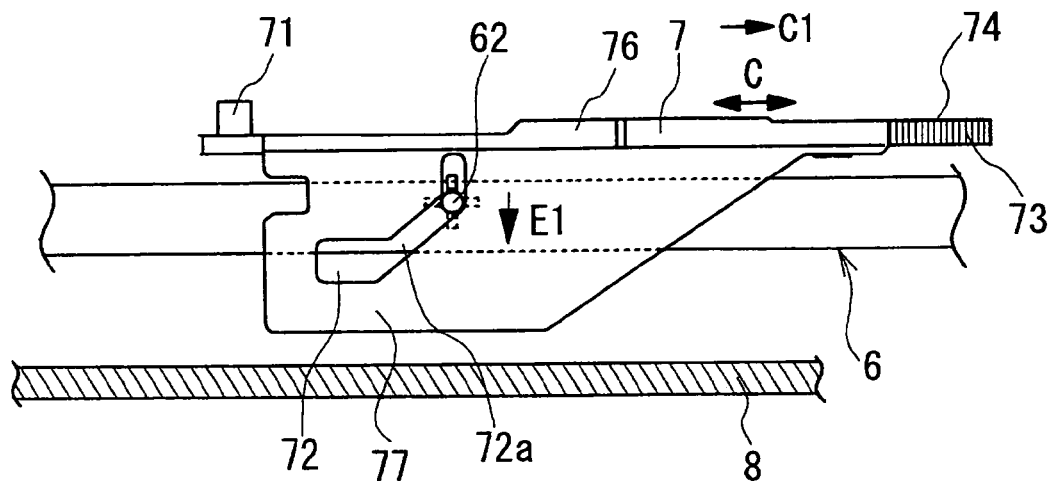
FIG. 4 is a side view showing a cam slider and a drive machine chassis of the above-mentioned apparatus.

FIG. 4 shows side views of the movable chassis 6 and the cam slider 7 which are watched from a direction shown by arrow X in FIG. 1. The cam slider 7 is made of a synthetic resin such as polyacetal which is superior to wear resistance and have a coefficient of elasticity smaller than polystyrene which is used for forming the tray 2, the main chassis 8, and so on. The cam slider 7 is molded to have an L-shaped section (see FIG. 1). The cam slider 7 has a boss 71, which is to be engaged with the guide groove 23 of the tray, on an upper face 76 facing the tray 2 (see FIG. 1). The above-mentioned cam groove 72 is formed on a side face 77 of the cam slider 7 facing the movable chassis 6. The cam slider 7 is slidably held on a slider support 82 of the main chassis 8 like a cantilever. A second rack 74, which is to be engaged with the upper stage gear 32 of the drive gear 3, is formed at a front end portion 73 of the cam slider 7.

The main chassis 8 has the above-mentioned fulcrums 81 for rotatably bearing the movable chassis 6, the slider support 82 for slidably supporting the cam slider 7 and a pair of the stoppers 83 to be contacted with the first stoppers 24 at the terminal position of drawing of the tray 2 (see FIGS. 1 and 2).

During initial phase of drawing of the tray 2, the cam slider 7 is driven by the drive gear 3 so as to slide in a direction shown by arrow C1 in FIG. 4. Following to the movement of the cam slider 7, the boss 62 of the movable chassis 6 moves along an inclined portion 72a of the cam groove 72. Consequently, a free end of the movable chassis 6 comes down in a direction shown by arrow E1 with the revolving table 5, so that an optical disc can be unclamped from the revolving table 5.

Figure 5A:
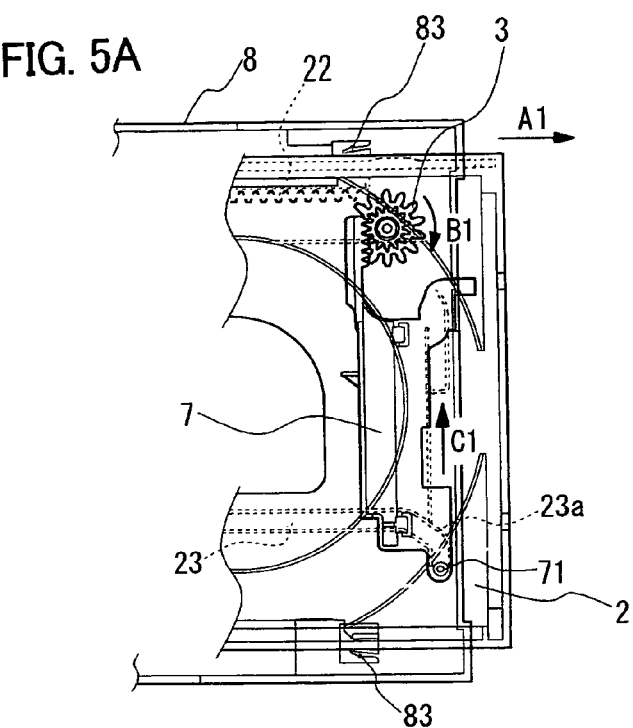
FIGS. 5A, 5B and 5C are plan views showing motion of drawing of the tray of the above-mentioned apparatus in chronological order.

Subsequently, the drawing motion of the tray 2 is described with reference to FIGS. 5A to 5C. As can be seen from FIG. 5A, when the tray 2 is pulled in the inside of the main chassis 8, the drive gear 3 is disengaged with the first rack 22 of the tray 2. When the drive gear 3 is rotated in a direction shown by arrow B1 from such a state, the cam slider 7 starts to move in a direction shown by arrow C1. Following to the movement of the cam slider 7, not only the optical disc is unclamped, but also the boss 71 of the cam slider 7 pushes an inclined portion 23a of the guide groove 23, so that the tray 2 is moved in a direction shown by arrow A1. Thereby, the first rack 22 engages with the drive gear 3, and the tray 2 is continuously moved with drive gear 3 in the direction shown by arrow A1.

Figure 5B:
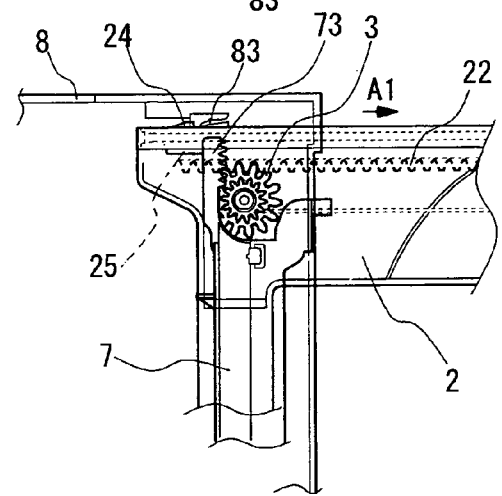

As can be seen from FIG. 5B, when the tray 2 moves to a position just before the terminal point of drawing of the tray 2, the front end portion 73 of the cam slider 7 contacts the second stopper 25, first. Since the cam slider 7 is formed of a material having a coefficient of elasticity smaller than that of the tray 2, it is possible to reduce the blow sound in comparison with that in a case that the cam slider 7 is formed of a material having substantially the same coefficient of elasticity of that of the tray 2. The front end portion 73 of the cam slider 7 serves as an elastically deformable member in this embodiment.

Figure 5C:
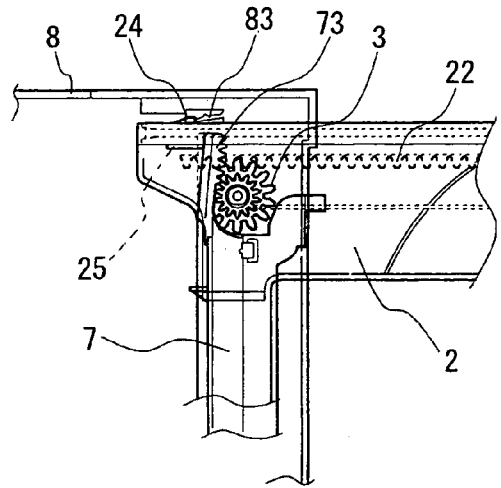

As can be seen from FIG. 5C, when the tray 2 is further moved in the direction shown by arrow A1 after contacting of the front end portion 73 of the cam slider 7 with the second stopper 25, the front end portion 73 of the cam slider 7 is elastically deformed due to pressure of the second stopper 25, and finally the first stoppers 24 of the tray 2 contact with the third stoppers 83 of the main chassis 8. Since the moving speed of the tray 2 is decelerated largely due to elastic deformation of the front end portion 73 of the cam slider 7, the blow sound due to the contact of the first stoppers 24 and the third stoppers 83 can be radically reduced.

As described above, according to the optical disc apparatus 1 in accordance with the embodiment of the present invention, the front end portion 73 of the cam slider 7 made of, for example, polyacetal which is elastically deformed easily contacts the second stopper 25 of the tray 2 at a position just before the terminal position of drawing of the tray 2, and the moving speed of the tray 2 is largely decelerated due to elastic deformation of the front end portion 73 of the cam slider 7. Thus, the blow sound due to contact of the first stoppers 24 of the tray 2 with the third stoppers 83 of the main chassis 8 can be radically reduced. As a result, a quiet optical disc apparatus can be realized.

In addition, since polyacetal, which is an example of the material of the cam slider 7, is superior in wear resistance, it is no need to spread a fine particle lubricant on contacting portions of the second stopper 25 of the tray 2 and the front end portion 73 of the cam slider 7. Consequently, there is no fear to give bad influence to movement of the optical disc apparatus 1 due to scattering of the powder ingredient of the lubricant in the inside of the apparatus. Smoothness of the drawing motion of the tray 2 can be maintained in long-term use.

Furthermore, the front end portion 73 of the cam slider 7, which is conventionally used for moving the movable chassis 6, is used to decelerate the moving speed of the tray 2 owing to elastic deformation thereof when the second stopper 25 of the tray 2 contacts thereto. Thus, it is possible to prevent cost increase of the optical disc apparatus 1 without inviting increase of number of components of the apparatus.

In addition, as for the present invention, various kinds of transformation is possible without it being limited to constitution of the above-mentioned embodiment. For example, another material can be used as a material of the cam slider 7, if it has a coefficient of elasticity smaller than that of a material of the tray 2 and the main chassis 8, without being limited to polyacetal. The other party where the second stopper 25 makes contact before the first stoppers 24 of the tray 2 contact the third stoppers 83 of the main chassis 8 may be an elastic spring member made of a material having a coefficient of elasticity smaller than that of a material of the tray 2, without being limited to the front end portion 73 of the cam slider 7.

This application is based on Japanese patent application 2004-80435 filed Mar. 18, 2004 in Japan, the contents of which are hereby incorporated by references.

Although the present invention has been fully described by way of example with reference to the accompanying drawings, it is to be understood that various changes and modifications will be apparent to those skilled in the art. Therefore, unless otherwise such changes and modifications depart from the scope of the present invention, they should be construed as being included therein.

What is claimed is:

1. An optical disc apparatus comprising:
   a main chassis;
   a tray, to which an optical disc is disposed, movably held on the main chassis and drawn from the main chassis in a predetermined direction;
   a driving mechanism provided on the main chassis for reciprocally moving the tray in the predetermined direction; and
   an elastically deformable member which contacts the tray just before a terminal position of drawing of the tray from the main chassis where the drawing motion of the tray is stopped in a manner so that moving speed of the tray is decelerated due to elastic deformation of the elastically deformable member;
   wherein the driving mechanism includes a cam slider, which is slidably held on the main chassis for moving a movable chassis around a pivot and serves as the elastically deformable member; and
   wherein a front end portion of the cam slider contacts the tray.

2. The optical disc apparatus in accordance with claim 1, wherein a material of the elastically deformable member is superior to wear resistance and has a coefficient of elasticity smaller than that of a material of the tray.

3. The optical disc apparatus in accordance with claim 2, wherein the material of the elastically deformable member is polyacetal.

4. The optical disc apparatus in accordance with claim 1 further comprising:
   the movable chassis movably held on the main chassis in a direction perpendicular to a face of the tray on which the optical disc is disposed; and
   a revolving table, to which the optical disc is mounted, provided on the movable chassis.

5. The optical disc apparatus in accordance with claim 4, wherein the tray has a stopper which contacts with the front end portion of the cam slider when the tray reaches to a position just before the terminal position of drawing of the tray.

6. The optical disc apparatus in accordance with claim 5, wherein the tray further has another stopper which contacts with a stopper of the main chassis when the tray reaches to the terminal position of drawing of the tray.

7. An optical disc apparatus comprising:
   a main chassis;
   a tray, to which an optical disc is disposed, movably held on the main chassis and drawn from the main chassis in a predetermined direction;
   a movable chassis movably held on the main chassis in a direction perpendicular to a face of the tray on which the optical disc is disposed;
   a driving mechanism provided on the main chassis for reciprocally moving the tray in the predetermined direction, and for moving the movable chassis around a pivot;
   a revolving table, to which the optical disc is mounted, provided on the movable chassis; and
   an optical pickup provided on the movable chassis, and emitting laser beam for writing and/or reading data on and/or from the optical disc mounted on the revolving table while it has been revolved; wherein
   the tray has a pair of first stoppers and a second stopper;
   the main chassis has a pair of third stoppers to which the first stoppers contact when the tray reaches to a terminal position of drawing motion of the tray;
   the driving mechanism includes a cam slider for moving the movable chassis around the pivot, and made of a material superior to wear resistance and has a coefficient of elasticity smaller than that of a material of the tray; and
   the second stopper of the tray contacts a front end portion of the cam slider when the tray reaches to a position just before the terminal position of drawing of the tray, so that the front end portion of the cam slider is elastically deformed, moving speed of the tray is decelerated, and consequently blow sound due to contact of the first stoppers with the third stoppers can be reduced.

8. An optical disc apparatus comprising:
   a main chassis;
   a tray, to which an optical disc is disposed, movably held on the main chassis and drawn from the main chassis in a predetermined direction;
   a driving mechanism provided on the main chassis for reciprocally moving the tray in the predetermined direction; and
   an elastically deformable member which contacts the tray just before a terminal position of drawing of the tray from the main chassis where the drawing motion of the tray is stopped in a manner so that a moving speed of the tray is decelerated due to elastic deformation of the elastically deformable member;
   a movable chassis movably held on the main chassis in a direction perpendicular to a face of the tray on which the optical disc is disposed; and
   a revolving table, to which the optical disc is mounted, provided on the movable chassis;
   wherein the driving mechanism includes a cam slider which is slidably held on the main chassis for moving the movable chassis around a pivot, and serves as the elastically deformable member.

9. The optical disc apparatus in accordance with claim 8, wherein the tray has a stopper which contacts with a front end portion of the cam slider when the tray reaches to a position just before the terminal portion of the drawing of the tray.

10. The optical disc apparatus in accordance with claim 9, wherein the tray further has another stopper which contacts with a stopper of the main chassis when the tray reaches to the terminal position of drawing of the tray.

11. The optical disc apparatus in accordance with claim 8, wherein a material of the elastically deformable member is superior to wear resistance and has a coefficient of elasticity smaller than that of a material of the tray.

12. The optical disc apparatus in accordance with claim 11, wherein the material of the elastically deformable member is polyacetal.

* * * * *